United States Patent [19]
McClory

[11] 3,853,761
[45] Dec. 10, 1974

[54] FILTER

[75] Inventor: Robert M. McClory, Los Angeles, Calif.

[73] Assignee: Aqua-Chem. Inc., Milwaukee, Wis.

[22] Filed: May 25, 1973

[21] Appl. No.: 364,099

[52] U.S. Cl. ............... 210/100, 210/419, 210/420, 210/448, 210/449
[51] Int. Cl. ............................. B01d 35/02
[58] Field of Search .......... 210/419, 420, 424, 433, 210/435, 448, 449, 100, 130, 133

[56] References Cited
UNITED STATES PATENTS

| | | |
|---|---|---|
| 1,022,470 | 4/1912 | Dion .................................. 210/420 |
| 1,237,577 | 8/1917 | Svendsen ........................... 210/420 |
| 1,507,806 | 9/1924 | Zeller ................................ 210/424 |
| 1,958,073 | 5/1934 | Seidel ............................. 210/420 X |
| 3,476,251 | 11/1969 | Kudlaty .......................... 210/420 X |
| 3,741,394 | 6/1973 | Defenbaugh .................... 210/424 X |

Primary Examiner—Samih N. Zaharna
Assistant Examiner—Robert H. Spitzer
Attorney, Agent, or Firm—Fred Wiviott

[57] ABSTRACT

A water faucet filter unit with means for selectively directing impure water either through a replaceable filter cartridge or bypassing the cartridge, directly out a dispenser opening of the filter unit.

19 Claims, 3 Drawing Figures

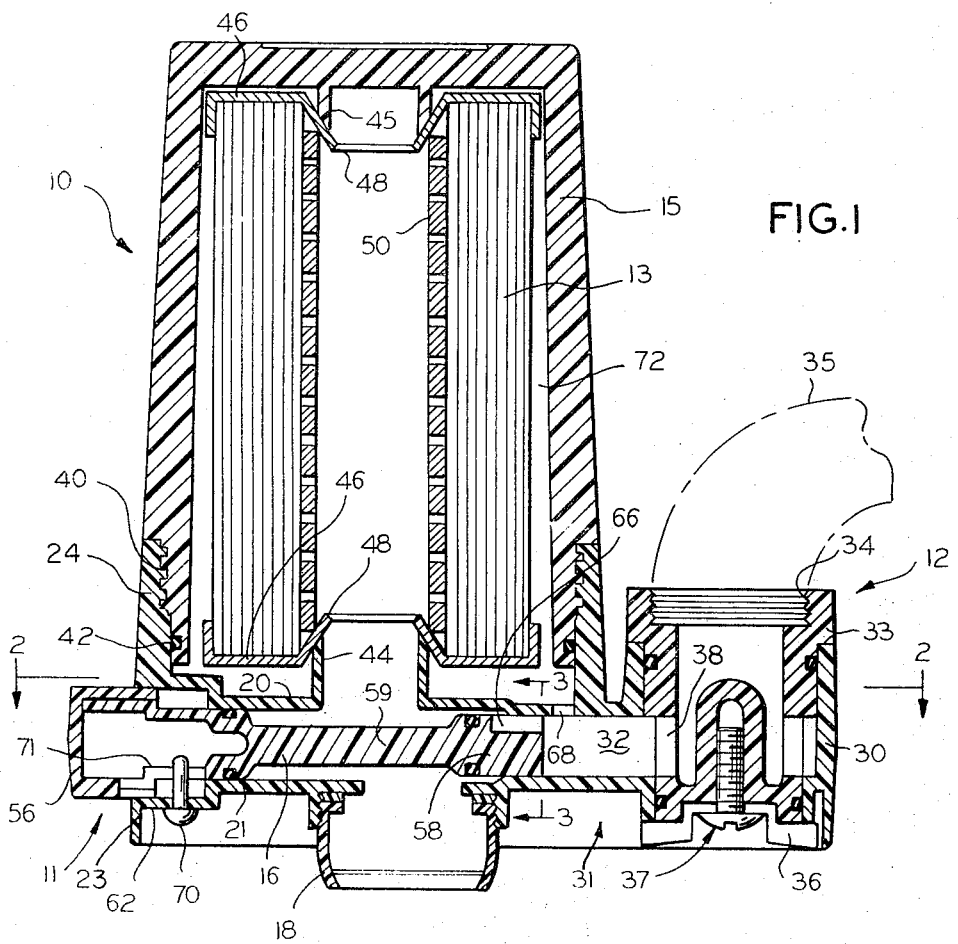
FIG.1
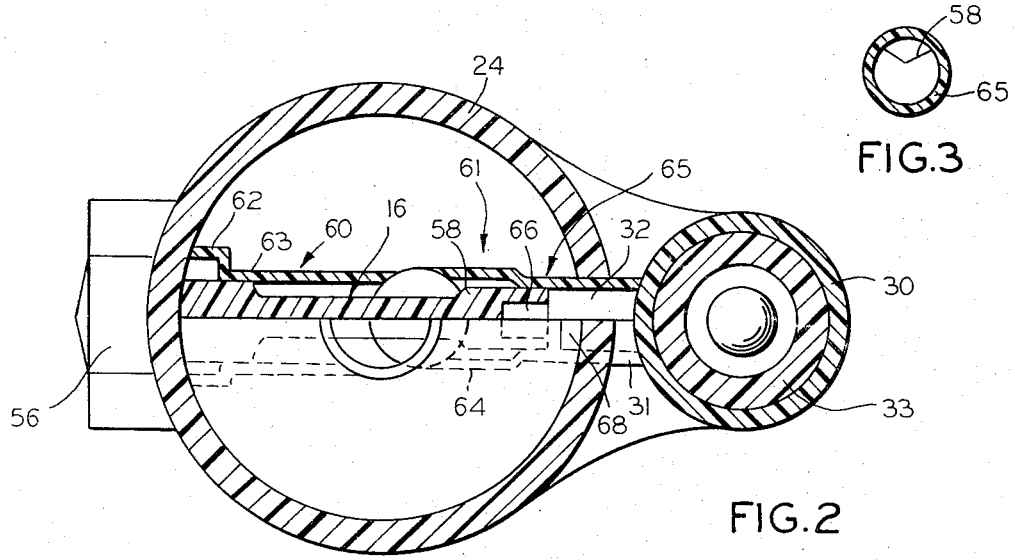
FIG.3
FIG.2

FILTER

BACKGROUND OF THE INVENTION

This invention relates to filters and more particularly to filters of the type which are attachable to household water faucets.

Various impurities such as minerals often affect the taste, odor and appearance of domestic tap water. In order to remove such impurities, filters are commonly coupled to the household water faucets. Such filters typically include a housing for containing a filter and coupling means for attaching the filter element into the water stream.

OBJECTS OF THE INVENTION

It is a primary object of the invention to provide a new and improved water faucet filter.

A further object of the invention is to provide a water faucet filter which is readily attachable to existing plumbing.

Another object of the invention is to provide a water faucet filter which allows for easy filter cartridge removal and replacement.

It is another object of this invention to provide a water faucet filter wherein the filter element can be bypassed.

It is a still further object of the invention to provide a faucet filter having increased filter cartridge life.

These and other more specific objects of the invention will appear from time to time in the following description of the preferred embodiment.

SUMMARY OF THE INVENTION

In general, the invention comprises a water faucet filter which is attached to an existing faucet merely by turning a coupling wheel to lock the filter onto the existing faucet spout. A housing on the filter unit of the invention contains a replaceable filter cartridge which may be removed merely by unscrewing the housing and replacing the filter cartridge. A deflection mechanism is provided in the filter to select flow paths either through the filter cartridge or bypassing the cartridge.

DESCRIPTION OF THE DRAWINGS

FIG. 1 is a longitudinal section of a water faucet filter according to a preferred form of the present invention;

FIG. 2 is a view taken along the line 2—2 of FIG. 1; and

FIG. 3 is a view taken along the line 3—3 of FIG. 1.

DESCRIPTION OF A PREFERRED EMBODIMENT

FIG. 1 illustrates a faucet filter 10 according to a preferred embodiment of the invention to include a base assembly 11 having coupling means 12 at one end for rapid attachment and detachment to a water faucet outlet. A filter cartridge 13 is mounted above base assembly 11 and within a removable housing 15 and a valve 16 is mounted in base assembly 11 for controlling the flow of water through the filter 10. When valve 16 is in a first position, water entering coupling 12 bypasses the filter 13 and passes directly out of a discharge spout 18 opening into the lower end of base 11 and when valve 16 is in a second position, the water is directed through filter cartridge 13 for removal of impurities prior to discharge.

The base 11 is generally circular in plan view and includes an upper wall 20 and bottom wall 21 which are joined by an annular side wall 23.

The coupling assembly 12 includes an outer shell 30 which is integral with and arranged in a generally parallel relation to the side wall 23 and is connected thereto by a hollow, generally tubular connecting portion 31 which defines a passage 32 opening into the interior of shell 30 and the space between the upper and lower walls 20 and 21 of base 11. A coupling member 33 is coaxial with and rotatably mounted within the shell 30 and has internally formed threads 34 at its upper end for attachment to an externally threaded end of a household water faucet 35. To facilitate rotation of the coupling member 33, a thumb wheel 36 may be suitably attached to the lower closed end thereof by means of a screw 37. Thumb wheel 36 also serves to hold coupling member 33 in position so that coupling 33 may rapidly be replaced with another coupling should this be required to attach to a different size faucet. In addition, a plurality of longitudinal slots 38 are formed in the coupling member 33 so that its interior will be in communication with the passage 32 regardless of its angular position.

The housing 15 has a generally inverted cup shape and may be releasably secured to base 11 in any suitable manner such as by means of threads 40 formed adjacent its lower outside surface for engaging mating threads formed on the inner surface of an annular upwardly extending collar portion 24 of the base wall 23. The extreme lower end of housing 15 may be unthreaded for telescopingly engaging an unthreaded portion of wall 23 to provide a sealing surface therebetween which may be augmented by a suitable annular seal 42.

The filter 13 is generally tubular and may be formed of any well known filtering material such as activated charcoal, which is supported in the desired tubular configuration. The filter cartridge 13 is preferably supported within housing 15 in such a manner that its outer surface is spaced from the inner surface of housing 15. Toward this end a short tubular axially extending section 44 may be integrally formed with and extending upwardly from the upper base wall 20 and a coaxial tubular section 45 may extend downwardly from the upper inner surface of housing 15. Filter 13 may be supported in a generally coaxial relation relative to housing 15 and on tubular sections 44 and 45 by means of resilient annular end caps 46. Each end cap 46 includes an oblique inwardly extending portion 48 which engages its associated tubular section 44 or 45 to support filter 13 in a generally coaxial relation relative to housing 15. In addition, end caps 46 prevent the medium being filtered from discharging axially of filter 13. A perforated tubular support core 50 may be disposed adjacent the inner surface of filter 13 and between said filter and the oblique portions 48 of end caps 46 to support the filter against the inwardly directed water pressure.

The valve member 16 may have any convenient shape such as for example, a generally bar-like member 59 having a push button 56 suitably affixed on one enlarged end thereof and a valve element 58 formed at its other. The opposite ends of the valve element 16 are received in tubular valve guide section 60 and 61 which are coaxial with each other and with the passage 32. Section 60 includes a large diameter portion 62 for receiving the push button 56 and a reduced diameter portion 63 for receiving the body of valve element 16. Valve guide section 61 also includes a smaller diameter portion 65 for receiving end 58 of the valve element 58. A notch 66 is also formed on the upper portion of valve member 59 to permit flow of fluid out of the reduced diameter portion 65 when the valve is in an open position as will be described more fully below. Further, an opening 68 is formed in the upper base wall 21 adjacent the inner surface of vertical wall 23 to place the upper surface of wall 20 in communication with passage 32.

In operation, when the water faucet 35 is turned on, water under pressure will enter passage 32 and acting on valve element 58 in the manner of a piston, urge it toward the left as viewed in FIG. 1. This permits water flow through notch 66 into the larger diameter portion 64 of valve guide 61 and then downwardly to discharge out of the discharge port 18. A pin 70 extending through the push button guide 62 and into a slot 71 formed in push button 56 limits the outward movement of the valve element 16. When it is desired to pass the fluid through filter cartridge 13, push button 56 is forced inwardly into the right against the water pressure until the unnotched portion of valve element 58 moves into the reduced diameter portion 65 of valve guide 61. This prevents the water from passing through valve guide 61 so that the only water flow path is upwardly through port 68 and into the space 72 surrounding filter element 13. The water pressure then forces the water through the filter element 13 whereby the water is permitted to discharge through tubular support 50 and exit port 18.

It can, therefore be seen that water flows through the filter element 13 only when push button 56 is depressed. When push button 56 is released, the free flow of water around valve element 58 and through the discharge port 18 short circuits the filter element 13 whereby the latter is subject to duty only when required. It will also be appreciated that filter element 13 may be replaced by unscrewing the housing 15, removing the end caps 46 and the support core 50 and then replacing the used cartridge with an unused element.

While only a single embodiment of the present invention has been illustrated and described, it is not intended to be limited thereby but only by the scope of the appended claims.

I claim:

1. A device for filtering impure liquids comprising:
   liquid flow control means having an inlet and an outlet, hollow housing means releasably secured to said liquid flow control means,
   filter disposed in said housing and having a first side in communication with said inlet and a second side communicating with said outlet,
   means within said liquid flow control means defining a liquid flow passage between said inlet and said outlet other than through said filter means, and
   selectively operable valve means associated with said flow passage defining means and having a first position for permitting liquid flow between said inlet and said outlet through said flow passage defining means by passing said filter means and a second position for preventing liquid flow through said flow passage defining means whereby liquid flow is directed from said inlet through said filter means to said outlet, said valve means being adapted to be manually moved to said second position and being constructed and arranged so that normal liquid pressure is effectiveto move said valve means to its first position.

2. The device set forth in claim 1 wherein said valve means is movable in a first direction from said second position to said first position, said valve means including a valve element having a first surface portion disposed in sealing engagement with said flow passage and a second surface portion exposed to the liquid pressure in said flow passage when said valve element is in its second position to provide a complement of force on said valve element directed in said first direction for urging said valve element out of said second position.

3. The device set forth in claim 2 wherein said valve means has a push-button means on the side thereof opposite to that of said valve element for moving said valve element from said first position to said second position, said liquid pressure being effective to move said valve element out of said second position when said push-button is released.

4. The invention set forth in claim 3 wherein saaid liquid flow control means includes a base portion, said base portion having first and second spaced apart openings defining said inlet and outlet respectively, said flow passage comprising a hollow tubular opening formed in said base portion and disposed between said inlet and outlet, at least a portion of said tubular opening being generally linear and extending in said first direction, said valve means being slidably mounted on said base portion for linear movement in said first direction, said valve element being movable into and out of the linear portion of said tubular passage upon sliding movement of said valve means, the first surface portion of said valve element corresponding to the internal surface of said tubular passage and being disposed in sealing engagement therewith when said valve element is in its second position, the second surface portion of said valve element being disposed on the inlet side of said valve means and said push-button being disposed on the outlet side thereof.

5. The invention set forth in claim 4 and including selectively operable means movable into and out of engagement with said valve means when the latter is in its second position for preventing the movement of said valve means out of its second position under the influence of said liquid pressure.

6. The device set forth in claim 1 and including means for selectively locking said valve means in its second position, said valve means having an end portion exposed to the water from said source whereby said valve means is urged to its first position when said locking means is released.

7. The device set forth in claim 6 wherein said end portion has a recess formed in the side thereof facing said inlet, the unrecessed portion of said end portion blocking said flow path defining means when said valve is in its second position, said recess permitting fluid flow around said end portion and into said flow path defining means when said valve means is in its first position.

8. The device set forth in claim 1 wherein said liquid flow control means includes a base portion, said base portion having first and second spaced apart openings defining said inlet and outlet respectively, said liquid flow passage means being disposed in said base portion and between said first and second openings, quick release means for securing said base portion to a faucet and including a hollow member rotatably mounted on said base portion and having an annular threaded portion formed at one end thereof and an annular opening coupled to said inlet whereby said threaded portion may be coupled to a water faucet without rotating said base portion.

9. The invention set forth in claim 8 wherein said housing is generally cup-shaped and has threads formed adjacent its open end, annular means disposed on said liquid flow control means and having mating threads for engagement by said first threads.

10. The device set forth in claim 1 wherein said flow path defining means has a first opening formed therein and communicating with said inlet and said first side of said filter means, a second opening formed in said flow path defining means and communicating with said second side of said filter means and said outlet, said valve means being disposed within said flow path defining means and between said inlet and said outlet, said valve means sealingly engaging said flow passage defining means when in said second position and being out of sealing engagement therewith when in said first position so that when in its first position liquid flows from said inlet to said outlet and when in its second position liquid flows from said inlet through said first opening, said filter means and said second opening to said outlet.

11. The device set forth in claim 10 wherein said flow path defining means includes a valve seat formed therein, said valve means including a valve element on one end thereof and engageable with said valve seat when in its second position to close said flow path defining means to liquid flow.

12. The device set forth in claim 11 wherein said liquid flow control means includes first attachment and detachment means for releasably engaging said housing and second attachment and detachment means associated with said inlet for releasably engaging a water source whereby said housing may be removed to replace said filter means without removing said device from said water source.

13. The device set forth in claim 12 wherein said filter element is generally tubular, said filter element being positioned in said housing with one surface in communication with said inlet when said valve means is in its position and its other surface in communication with said outlet.

14. The invention set forth in claim 13 wherein said housing is generally cup-shaped and has threads formed adjacent its open end, annular means disposed on said liquid flow control means and having mating threads for engagement by said first threads.

15. The device set forth in claim 14 wherein said second attachment and detachment means comprises a sleeve means rotatably mounted on said liquid flow control means and having means at one end attachable to a faucet and having port means communicating with said inlet.

16. The device set forth in claim 15 and including means for selectively locking said valve member in its second position, said valve means having an end portion exposed to the water from said source whereby said valve means is urged to its first position when said locking means is released.

17. The device set forth in claim 16 wherein said end portion has a recess formed in the side thereof facing said inlet, the unrecessed portion of said end portion blocking said flow path defining means when said valve is in its second position, said recess permitting fluid flow around said end portion and into said liquid flow path defining means when said valve means is in its first position.

18. The device set forth in claim 17 and including means for sealing the ends of said filter element to prevent the flow of water therearound and perforated tubular support means adjacent said other surface.

19. The device set forth in claim 18 wherein said flow path defining means includes a valve seat formed therein, said valve means including a valve element on one end thereof and engageable with said valve seat when in its second position to close said flow path defining means to liquid flow.

* * * * *

UNITED STATES PATENT OFFICE
CERTIFICATE OF CORRECTION

Patent No. 3,853,761        Dated December 10, 1974

Inventor(s) Robert M. McClory

It is certified that error appears in the above-identified patent and that said Letters Patent are hereby corrected as shown below:

Column 3, line 55, after "filter" insert --means--.

Column 4, line 5, delete "effectiveto" and substitute --effective to--.

Column 4, line 25, delete "saaid" and substitute --said--.

Signed and sealed this 18th day of February 1975.

(SEAL)
Attest:

RUTH C. MASON
Attesting Officer

C. MARSHALL DANN
Commissioner of Patents
and Trademarks